(12) United States Patent
Wang

(10) Patent No.: US 8,831,902 B2
(45) Date of Patent: Sep. 9, 2014

(54) LEAST CLICK TV

(75) Inventor: Haohong Wang, San Jose, CA (US)

(73) Assignee: TCL Lab (US) Inc., Santa Clara, CA (US)

( * ) Notice: Subject to any disclaimer, the term of this patent is extended or adjusted under 35 U.S.C. 154(b) by 428 days.

(21) Appl. No.: 13/241,146

(22) Filed: Sep. 22, 2011

(65) Prior Publication Data

US 2013/0081081 A1    Mar. 28, 2013

(51) Int. Cl.
*G06F 19/00* (2011.01)
*H04N 21/25* (2011.01)
*H04N 21/258* (2011.01)
*H04N 21/482* (2011.01)

(52) U.S. Cl.
CPC ... *H04N 21/25891* (2013.01); *H04N 21/25875* (2013.01); *H04N 21/4826* (2013.01)
USPC ............. 702/119; 702/182; 709/231; 725/35; 725/38

(58) Field of Classification Search
CPC .................. H04N 21/25875; H04N 21/25891; H04N 21/4826; H04N 5/44543; H04N 5/76; H04N 7/163
USPC ................... 702/62, 119, 122, 182, 183, 188; 709/203, 204, 218; 725/35, 38
See application file for complete search history.

(56) References Cited

U.S. PATENT DOCUMENTS

| | | | | |
|---|---|---|---|---|
| 6,973,411 | B2 * | 12/2005 | Kim .............................. | 702/182 |
| 7,945,689 | B2 * | 5/2011 | Painter et al. .................. | 709/231 |
| 2003/0126600 | A1 * | 7/2003 | Heuvelman ...................... | 725/35 |
| 2010/0312828 | A1 | 12/2010 | Besserglick et al. | |

FOREIGN PATENT DOCUMENTS

WO    WO 2006/013096 A1    2/2006
WO    WO 2008/022328 A2    2/2008

OTHER PUBLICATIONS

Ardissono, et al. "Architecture of a system for the generation of personalized Electronics Program Guide", 2001, pp. 1-8.
Yu, et al. "TV3P: An Adaptive Assistant for Personalized TV", IEEE Trans. Consumer Electronics, vol. 50, No. 1, Feb. 2004, pp. 393-399.
Fernandez, et al. "AVATAR: An Improved Solution for Personalized TV based on Semantic Inference", IEEE Trans. Consumer Electronics, vol. 55, No. 1, Feb. 2009. pp. 286-294.
Martinez, et al. "What's on TV Tonight? An Efficient . . . of TV Programs", IEEE Trans. Consumer Electronics, vol. 55, No. 1, Feb. 2009, p. 286-294.

(Continued)

*Primary Examiner* — John H Le
(74) *Attorney, Agent, or Firm* — Mei & Mark LLP

(57) ABSTRACT

A system for minimizing interactions with at least an input mechanism includes at least a management server communicatively coupled to at least a user endpoint device, at least one storage device, and at least one processor. The user endpoint device has at least a display, an input mechanism, and a transmitter mechanism. The storage device is configured to store data based on content displayed on the display, interactions with the input mechanism, and content available for viewing. The processor is configured to use software to process the data such that a layout configuration of content data is prepared for display. The layout configuration is derived from at least the interactions with the input mechanism and the layout configuration is designed to minimize additional user interactions with the input mechanism to select the prepared content data.

20 Claims, 6 Drawing Sheets

(56) References Cited

OTHER PUBLICATIONS

Shin, et al. "Socially Aware TV Program Recommender for Multiple Viewers", IEEE Trans. Consumer Electronics, vol. 55, No. 2, May 2009, pp. 927-932.

Lee, et al. "Personalized DTV Program Recommendation System under a Cloud Computing Environment", IEEE Trans. Consumer Electronics, vol. 56, No. 2, May 2010, pp. 1034-1042.

Bjelica, "Towards TV Recommender System: Experiments with User Modeling", IEEE Trans. Consumer Electronics, vol. 56, No. 3, Aug. 2010, pp. 1763-1769.

Lee, et al. "A User-Centered Remote Control System for Personalized Multimedia Channel Selection", IEEE Trans. Consumer Electronics, vol. 50, No. 4, Nov. 2004, pp. 1009-1015.

Isobe, et al. "Development of a TV Reception Navigation System Personalized with Viewing Habits", IEEE Trans. Consumer Electronics, vol. 51, No. 2, May 2005, pp. 665-674.

Parsons, et al. "Using viewing time to infer user preference in recommender systems", in Proc. AAAI Workshop on Semantic Web Personalization (SWP-04), pp. 52-64, 2004.

Yu, et al. "Understanding User Behavior in Large-Scale Video-on-Demand Systems", in Proc. EuroSys'06, Apr. 2006, Leuven, Belgium, pp. 333-344.

Jung, et al. "A Statistical Model for User Preference", IEEE Trans. Knowledge and Data Engineering, vol. 17, No. 6, Jun. 2005, pp. 834-843.

Lu, et al. "Automatic Mood Detection and Tracking of Music Audio Signals", IEEE Trans. Audio, Speech, and Language Processing, vol. 14, No. 1, Jan. 2006. pp. 5-18.

Kim, et al. "Real-time Emotion Detection System using Speech: Multi-modal Fusion of Different Timescale Features", in Proc. IEEE MMSP 2007.

Zhang, et al. "Utilizing Affective Analysis for Efficient Movie Browsing", in Proc. IEEE ICIP 2009.

Stauffer, et al. "Learning Patterns of Activity Using Real-Time Tracking", IEEE Transactions on Pattern Analysis and Machine Intelligence, Aug. 2000.

Mitra ,"Characterising Online Video Sharing and its Dynamics" , M.Tech thesis, IIT Delhi, Jul. 2009.

Perugini, et al. "Recommender Systems Research: A Connection-Centric Survey", Journal of Intelligent Information Systems, 23:2, 107-143, 2004.

Adomavicius, et al. "Toward the Next Generation of Recommender Systems", IEEE Trans. Knowledge and Data Engineering, vol. 17, No. 6, Jun. 2005, pp. 734-749.

Wickramarathne, et al. "CoFiDS", IEEE Trans. Knowledge and Data Engineering, vol. 23, No. 2, Feb. 2011, pp. 175-189.

Brusilovsky, P. et al., The Adaptive Web: Methods and Strategies of Web Personalization, 2007, pp. 1-10 of front matter, Springer, Germany.

PCT/US2012/052245, "International Preliminary Report on Patentability," The International Bureau of WIPO, PCT/IB/373 mailed Mar. 25, 2014, pp. 1-4.

* cited by examiner

LEAST CLICK TV

TECHNICAL FIELD

The present disclosure relates generally to user adaptive systems. More specifically, the disclosure relates to a system and method for landing at favorable TV content with fewer remote control clicks.

BACKGROUND

Improving TV user experiences is a key problem in consumer electronics production and multimedia applications development. With the emergence of many forms of smart TVs, the current TV systems are experiencing significant in-and-out upgrading, from hardware, firmware, software framework, applications, to user experiences. Many new trials have been introduced to enhance users' interaction with TV, for example, by providing a keyboard as a part of the remote control; and another proposal is a motion-sensor based remote control to enable TV users to point and even drag and drop an icon on the TV screen. People start to debate whether a lean-back (passive) or a lean-forward (active) usage model better fits user TV experiences. On the other hand, the cloud computing era is coming, and many web-based cloud services, for example, mapping and video sharing services, have been introduced to the TV world to further enhance the system's capability and smartness.

There is a recent statistical report showing that in the US, people on average watch 4 hours of TV per day, however, 86% of the TV viewers have no idea what to watch when they sit in front of the TV. If each TV is sufficiently smart to recognize the viewer (or viewer group), understand the viewer's preferences, and recommend the right content for the viewer to watch, then a certain kind of user experience can be brought to the TV viewer. Many companies and research organizations have made efforts in this area for the past decade, and as a consequence, electronics program guide (EPG) and TV recommendation systems are current trends in the field. The results can be seen in product proposals such as TV3P, AVATAR, and queveo.tv, and in concepts such as the Semantic Web and PDPR DTV.

These exemplary efforts are incorporated herein by reference via exemplary works: L. Ardissono, F. Portis, and P. Torasso, "Architecture of a system for the generation of personalized Electronics Program Guide", 2001; Z. Yu, X. Zhou, "TV3P: An Adaptive Assistant for Personalized TV", IEEE Trans. Consumer Electronics, Vol. 50, No. 1, February 2004, pp. 393-399; Y. B. Fernandez, J. J. P. Arias, M. L. Nores, A. G. Solla, and M. R. Cabrer, "AVATAR: An Improved Solution for Personalized TV based on Semantic Inference", IEEE Trans. Consumer Electronics, Vol. 52, No. 1, February 2006, pp. 223-231; A. B. B. Martinez, J. J. P. Arias, A. F. Vilas, J. G. Duque, and M. L. Nores, "What's on TV Tonight? An Efficient and Effective Personalized Recommender System of TV Programs", IEEE Trans. Consumer Electronics, Vol. 55, No. 1, February 2009. pp. 286-294; C. Shin and W. Woo, "Socially Aware TV Program Recommender for Multiple Viewers", IEEE Trans. Consumer Electronics, Vol. 55, No. 2, May 2009, pp. 927-932; and S. Lee, D. Lee, S. Lee, "Personalized DTV Program Recommendation System under a Cloud Computing Environment", IEEE Trans. Consumer Electronics, Vol. 56, No. 2, May 2010, pp. 1034-1042.

Although many TV recommendation systems have been proposed to improve user experiences, the efforts were undermined by a superficially concluded user preferences investigation. The efforts were also limited by a lack of control on the endpoint devices or return channels from the endpoints to the content/service provider. Some systems provide users the capability to convey explicit feedback during their watching experience, which can seem annoying or distracting for users if embedded in content. Another way to provide feedback is to provide specific buttons, for example, like/dislike, on the remote control to collect users' feedback. Yet another way is implicit user feedback collection, which includes deriving the viewers' tastes from their program selection history, using viewing time as an indication of user preferences, and so on.

These feedback collection methods and systems are incorporated herein by reference via exemplary works: M. Bjelica, "Towards TV Recommender System: Experimental with User Modeling", IEEE Trans. Consumer Electronics, Vol. 56, No. 3, August 2010, pp. 1763-1769; W. P. Lee, and J. H. Wang, "A User-Centered Remote Control System for Personalized Multimedia Channel Selection", IEEE Trans. Consumer Electronics, Vol. 50, No. 4, November 2004, pp. 1009-1015; T. Isobe, M. Fujiwara, H. Kaneta, T. Morita, and N. Uratani, "Development of a TV Reception Navigation System Personalized with Viewing Habits", IEEE Trans. Consumer Electronics, Vol. 51, No. 2, May 2005, pp. 665-674; and J. Parsons, P. Ralph, and K. Gallagher, "Using viewing time to infer user preference in recommender systems", in Proc. AAAI Workshop on Semantic Web Personalization (SWP-04), pp. 52-64, 2004.

In an effort to provide viewers preferred content for selection, Applicant proposes a system and method for presenting content in a format that minimizes the amount of remote control use needed to select desirable content.

SUMMARY

In one embodiment, a system minimizes interactions with an input mechanism. The system comprises a management server communicatively coupled to a user endpoint device, the user endpoint device comprising at least a display configured to display content, an input mechanism configured to change the content displayed on the display, and a transponder mechanism configured to communicate data related to interactions with the input mechanism and displayed content. The management server is further communicatively coupled to at least one processor, at least one storage device, and at least one computer-readable storage medium storing software configured to perform data processing. The at least one storage device is configured to store data based on content displayed on the display, interactions with the input mechanism, and content available for viewing. The at least one processor is configured to use the software to process the data such that a configuration of content data is prepared for display and the configuration is derived from at least the interactions with the input mechanism and the configuration is designed to minimize additional user interactions with the input mechanism to select the prepared content data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Figure 1:
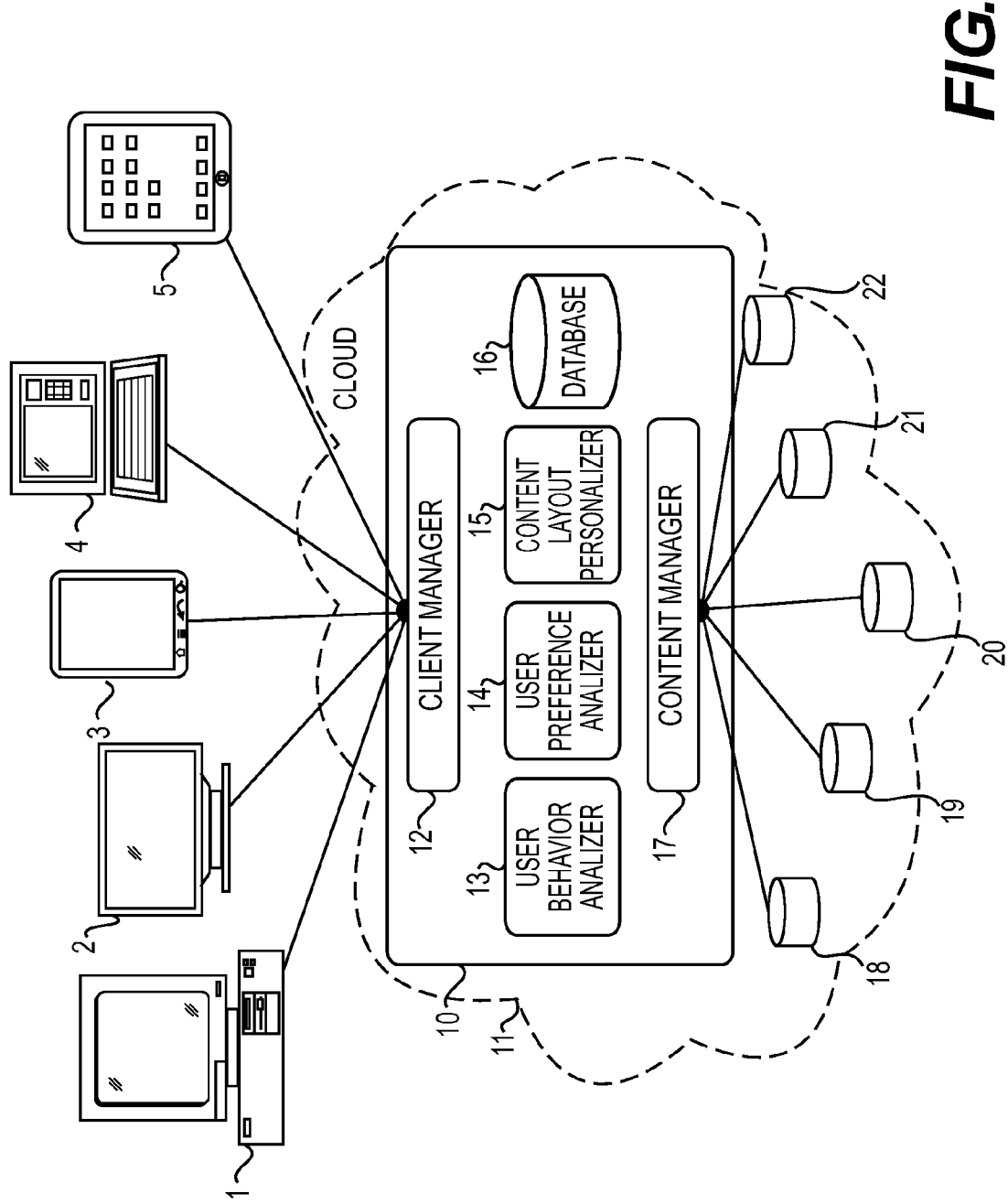
FIG. 1 is an example of a simplified system having endpoints, content providers and a client and content management server.

Reference will now be made in detail to the present exemplary embodiments, examples of which are illustrated in the accompanying drawings. Wherever possible, the same reference numbers will be used throughout the drawings to refer to the same or like parts.

In this work, I link the content display on the screen (or other endpoint device) directly to the user remote control usage model in the system design, by utilizing the user interaction frequency as the target to refine the TV watching experiences. This effort maps a TV user experience problem into an optimization problem to minimize the frequency of user interaction and/or the clicks on the keys of the remote control. A novel approach based on a probability table of key transferring and user mood detection is proposed to indirectly determine the content layout, and the method can be naturally extended on all types of remote control devices. Furthermore, a novel hybrid layout-optimized content recommendation algorithm is proposed to select content items from a large database and present it on the screen with a layout that fits into user's preferences.

An end-to-end model refines TV user experiences by pushing the right content to users to reduce the user interaction frequency with the TV. The user experience problem is abstracted into an optimization problem. That is, given the user's past interaction history, a content recommendation model minimizes the frequency of a user's clicks on the remote control. Here, assumptions include that a user's click frequency on the remote control is directly linked to the user's satisfaction with the current viewing content, and that less interaction implies that the user is comfortable with the current viewing content. Additionally, the user's mood is detected real-time from his/her click frequency, content selection, as well as behavior consistency with the past statistics, and the mood is considered as a factor of the personalization process.

As explained in more detail below, the least click TV system and method comprises a system architecture and major components, a user behavior analysis algorithm, a hybrid method to analyze user's preferences, and a layout personalization algorithm.

The system links the content displayed on the screen (or other endpoint devices) directly to the user remote control usage model in a system design, and uses the user interaction frequency as a target to refine the user experience of TV watching. In addition, it is the first effort to map a TV user experience problem into an optimization problem subject to minimize the frequency of user interaction and/or the clicks on the keys of the remote control. It includes a novel approach based on a probability table of key transferring and user mood detection, which are proposed to indirectly determine the content layout. The method can be naturally extended on all types of remote control devices including future ones.

A novel hybrid layout-optimized content recommendation algorithm is proposed below to select content items from a large database and present them on the screen with a layout that fits user preferences and minimizes the number of clicks on an input device necessary to select preferred content.

1.0 System Architecture

As shown in FIG. 1, the system is a combination of a cloud 11 and endpoints 1-5, where the endpoints are a variety of kinds, for example, computer 1, television 2, mobile phone 3, laptop 4, tablet 5 and so on. In general, any device with a screen or projection capability that can display visual content can be an endpoint in the general scope of this system. The endpoints can convey visual or audiovisual media or other multimedia. The media can include books, games, movies, pictures, slideshows, TV programs, content directories, content information, icons, and other graphical user interface (GUI) selectable and viewable items.

The endpoints can include software, hardware, and/or firmware for implementing the methods and systems set forth herein. For example, the television 2 can be preconfigured with the necessary software and hardware such as a cache, RAM, ROM, transmitter, receiver, processor etc to track such things as user interactions with a remote control, content selected for display, a length of time a program is displayed, and manipulations to the content such as fast forward, rewind, and pause. Other devices such as the mobile phone 3 or laptop 4 can have features such as a cache, RAM, ROM, transmitter, receiver, processor etc that enable it to download an application ("app") to allow the devices to participate in the system set forth herein. With the widespread availability of internet and Wi-Fi enabled TVs, it is also contemplated that a television 2 can participate with the system via downloadable applications.

The endpoints are associated with at least one input device, such as a keyboard, remote control, keypad, touchpad, synaptic pad, mouse, or track-ball. The input devices can comprise elements such as physical or rendered buttons or other tactile sensors and mechanisms to convert interactions in to digital data. The endpoints typically include a cache, memory, processor, router, software, computer readable storage medium (CRM), transponder or transmitter and receiver, battery or other power supply, wireless, optical or LAN or other internet or transmission connectivity and other firmware, hardware, or software components well known in the art for providing their intended content display and manipulation functionality. For simplicity of explanation, but not intended as limiting the extent of the physical structure, most examples will focus on a user's interaction with a television 2 and it's affiliated remote control 400.

In the cloud 11, a set of components communicate and work with each other. The components can be physically located inside a single server, or the components can sit at different servers or clouds and communicate via standard web service protocols across connectivity such as cables, wires, routers, wireless devices, towers, hotels, etc. For simplicity, hardware, software, and firmware layouts are not shown in the figures. However, it is to be understood that these are a part of the system, along with various components such as computer readable storage mediums (CRMs), software programs, processors, memories (RAM and or ROM), servers, routers, connectivity elements (cables, couplers, routers, wireless transceivers etc.) and so on.

In the example shown in FIG. 1, for simplicity, one cloud 11 is shown with a server 10 with communication means for accessing content databases 18-22. The content databases can be maintained by this service or the content databases 18-22 can be provided by third party content suppliers such as subscription services and content vendors. The example of FIG. 1 further shows a client manager 12 that communicates with many types of endpoints 1-5, traces user interactions with a remote control or other input device, and collects user inputs into at least one database 16.

Figure 2:
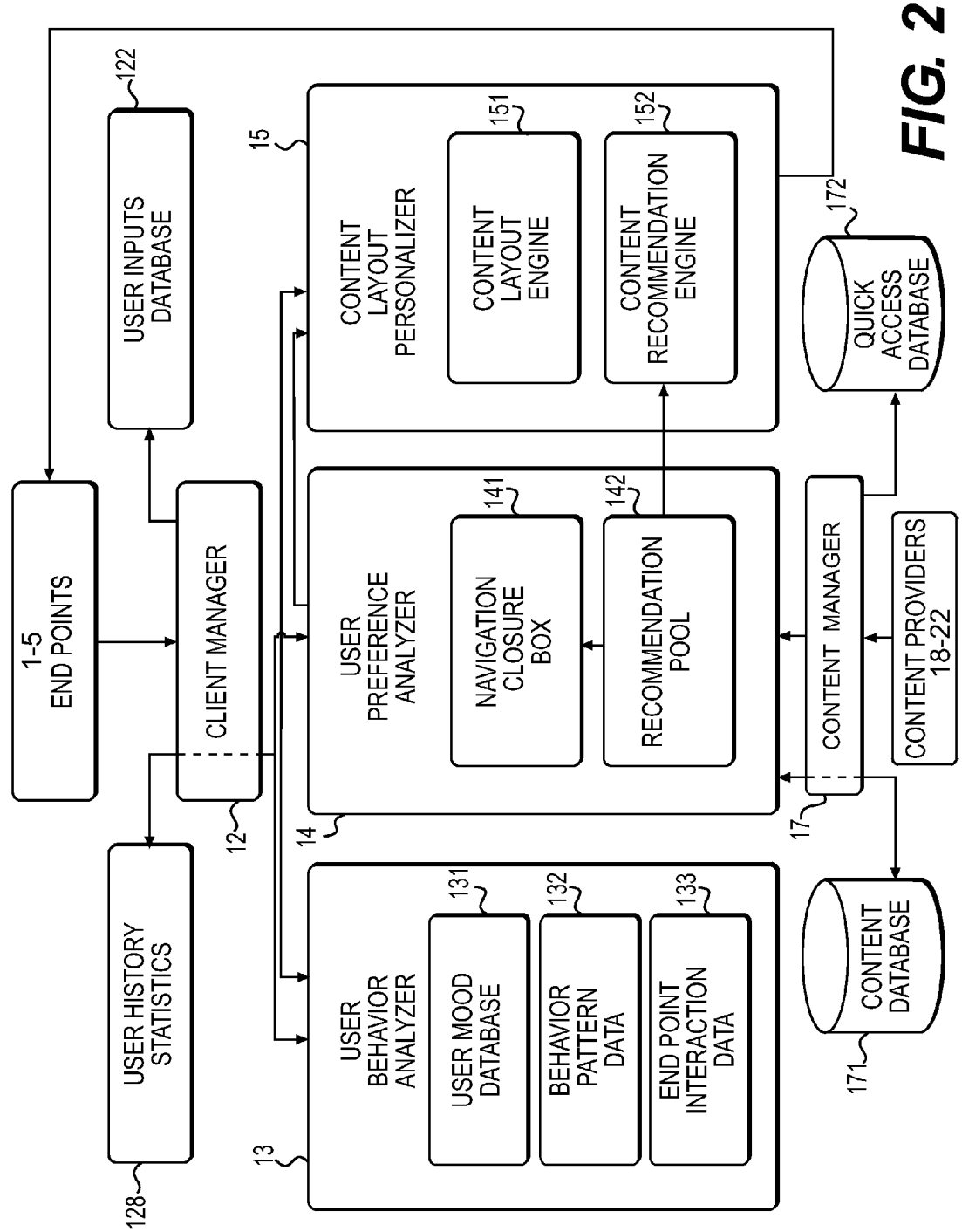
FIG. 2 is an example of structures, stored data types, and data and content flow for the system of FIG. 1.
Figure 3:
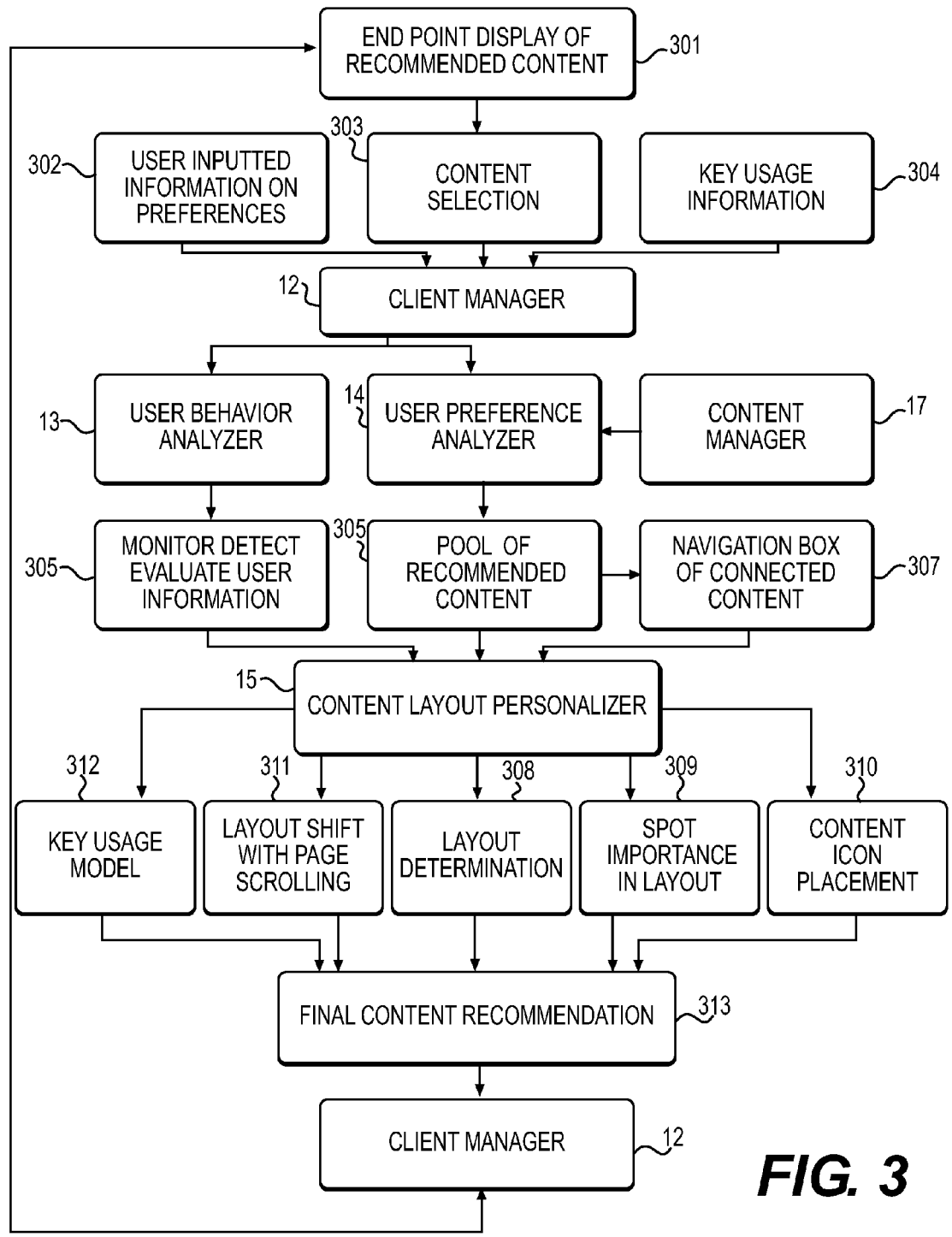
FIG. 3 is an example of a flow diagram for routing and manipulating data and content through the system of FIG. 1.

FIGS. 1-3 further illustrate the system architecture and flow of system information and content.

A content manager 17 works with multiple clouds, or as shown, content databases 18-22. Content manager 17 provides access to many types of content, including movies, TV programs, online videos, music, online gaming and so on. Content manager 17 also searches through the content for desirable titles to push to the user. Additionally, content manager 17 stores accessed meta-data into a quick-access database 172 so that content access will speed up if a used content is checked out again by other users. This speeds up the viewing of "most viewed" or "popular" content. Content manager 17 can maintain attribute data such as actor, actress, genre, title, viewing time, etc. in the same database as the content, or content manager 17 can maintain a separate database of attribute data. The attribute data can be affiliated with displayable icons that represent the attributes and/or content.

User behavior analyzer 13 closely monitors the user's interactions with the endpoint 1-5, detects the user's mood, and evaluates the user's behavior pattern on the remote control 400. For example, a user could be very fluent in traversing TV channels via the digital keys 409, or a user may only limit him/herself to the arrow keys 407 to move around. The user interactions are stored as endpoint interaction data 133, the user's mood is stored as user mood data 131, and the behavior patterns are stored as behavior pattern data 132. The output of this module will be used in the content layout personalizer module 15.

User preference analyzer 14 monitors the user's viewing history in a longer term and identifies the main interests of the user according to the user's selection of content genre, actors/actresses, TV channels, and so on. The user preference analyzer 14 derives a recommendation pool 142 using a hybrid approach, below, that combines content-based filtering and collaborative filtering. In general the pool forms a navigation closure box 141 that includes the content the user may access via a set of connections from the last content he/she showed interest in or that he/she seems not interested in. As one example of the connections, the user preference analyzer 14 can affiliate two movies via a limited number of connections. For example, a user selects one movie. The user preference analyzer 14 can select, or the user can indicate, a specific preferred actor, which leads to the selection of the actor's other movie, which in turn causes the selection of a genre of movies of the same type. Another actor and his movie can then be selected as a preferred movie to offer to the user based on the previous selections by the user and/or user preference analyzer 14.

Content layout personalizer 15 contains a layout engine 151 and a content recommendation engine 152. The layout engine 151 determines the layout of each page according to the user preference obtained by collaborative filtering, and the relative importance of each spot in the layout. The content recommendation engine 152 aims to select a number of content icons from the recommendation pool 142 and fill them into the layout design, and to use a certain strategy to determine the content selection for the page shifting. During the layout process, the user's inputs are analyzed to produce a key usage model to incorporate with a content preference ranking model derived from the user history statistic. The incorporated results are used to optimize the user's interaction with the TV, thus the user's natural remote control usage habit can be maintained.

The user behavior analyzer 13 relies on user history statistics 121 collected by/via the client manager 12. User preference analyzer 14 relies on not only the history statistics 121 but also the support of content manager 12 to access a meta-data set of the content database 171. To supply the meta-data set, the content database 171 can comprise a variety of data types or an assimilation of databases such as client profile, content source profile, user behavior history, user preference model, personalized content layout model, cached content meta-data, or cross-reference model. Content layout personalizer 15 relies on the models obtained from user behavior analyzer 13 and user preference analyzer 14 for final content recommendation, and the user interface is eventually rendered onto the display via messages to and from client manager 12.

In the proposed system, there are off-line training processes in the user behavior analyzer 13 and user preference analyzer 14 modules for the clients. The clients may provide refined parameters for an online process which determines the content recommendation in real-time with the collaboration of content layout personalizer 15 and content manager 17. That is, the client can further supply data on preferences such as actor, actress, genre, titles, viewing time, game preferences, category data, layout data such as grid size or shape or style, display size, preferred interaction buttons, etc.

FIG. 3 illustrates a simplified flow diagram of data collection, manipulation and content recommendation. For example, a user views an endpoint display of recommended content 301. The user makes a content selection 303 using remote control 400. The program information is forwarded to the client manager 12 along with key usage information 304 which provides system information on the keys used on the remote control 400 to select the content. The user can contemporaneously or separately provide user inputted information on preferences 302 to provide additional information on desired content. The additional information can relate to the user's mood, favorite actors/actresses, favorite programs, favorite games, content preferences related to time of day or day of week, least favorite information, blocked programming, parental controls (V-chip settings), etc.

The client manager 12 can store the information as data and can forward the information data to the user behavior analyzer 13 and the user preference analyzer 14. The user behavior analyzer 13 can monitor, detect, evaluate user information 305 and provide module results to the content layout personalizer 15. The user preference analyzer 14 can receive content information from the content manager 17 and can create a pool of recommended content 306 that can be used to create a navigation box of connected content 307. The pool of recommended content 306 can be provided directly to the content layout personalizer 15 along with the navigation box of connected content 307.

The content personalizer 15 provides a layout determination 308, a spot importance in layout 309, content icon placement 310, a layout shift with page scrolling 311 and a key usage model 312. These are combined in to a final content recommendation 313 that is forwarded back by the client manager 12 to the endpoint for display. The user can then select content from the endpoint display of recommended content 301 and the selected content can be used to further refine the next recommendation.

2.0 User Behavior Analyses

The prior art is full of examples of user behavior modeling and its impact on recommendation systems and applications. For example, in incorporated by reference works: Yu et al., "Understanding User Behavior in Large-Scale Video-on-Demand Systems," in *Proc. EuroSys '06*, April 2006, Leuven, Belgium; Jung et al., "A statistical Model for User Preference," IEEE Trans. Knowledge and Data Engineering, Vol. 17, No. 6, June 2005, pp. 834-843; and Brusilovsky et al., *The Adaptive Web: Methods and Strategies of Web Personalization*, Springer-Verlag, 2007.

The instant system and method analyzes the user behavior from many angles in order to catch the internal connections between the user's behavior and his/her preferences. The analysis provides the following cues useful for building a user behavior model:

- The current mood of the user, which can be determined by the click pace of the user's interaction, the content genre selected for watching, the frequency of interaction with the input device, and so on;
- The key usage pattern or the user's habit in utilizing the remote control. That is, the variety of ways a user uses an endpoint input such as a remote control, which can include the sequence of button selection and can include differences peculiar to veteran users that use a remote control in a very fluent manner and other users that only explore very limited keys on the remote control;
- The number of users as a single consumer or a family. This can be determined from the content selection, as typically men, women, kids, and elders may have different tastes on the content selection. For families with members having almost the same taste, it is no harm to consider the client as a single consumer; and
- The usage model of the TV, for example, typical watching hours, frequency of TV watching, content sources, and so on.

The usage model obtained from the analysis will be used in not only the content recommendation process but also in the content layout considerations.

2.1 Key Usage Pattern

Different people have different key usage patterns, which include the frequency of remote control usage, the frequency of certain key usage, and the frequency of certain key transferring. In this work, probability tables are maintained for all these patterns, and used in identifying the user or user group and determining the content layout that fits the best into the user's behavior model.

Figure 4:
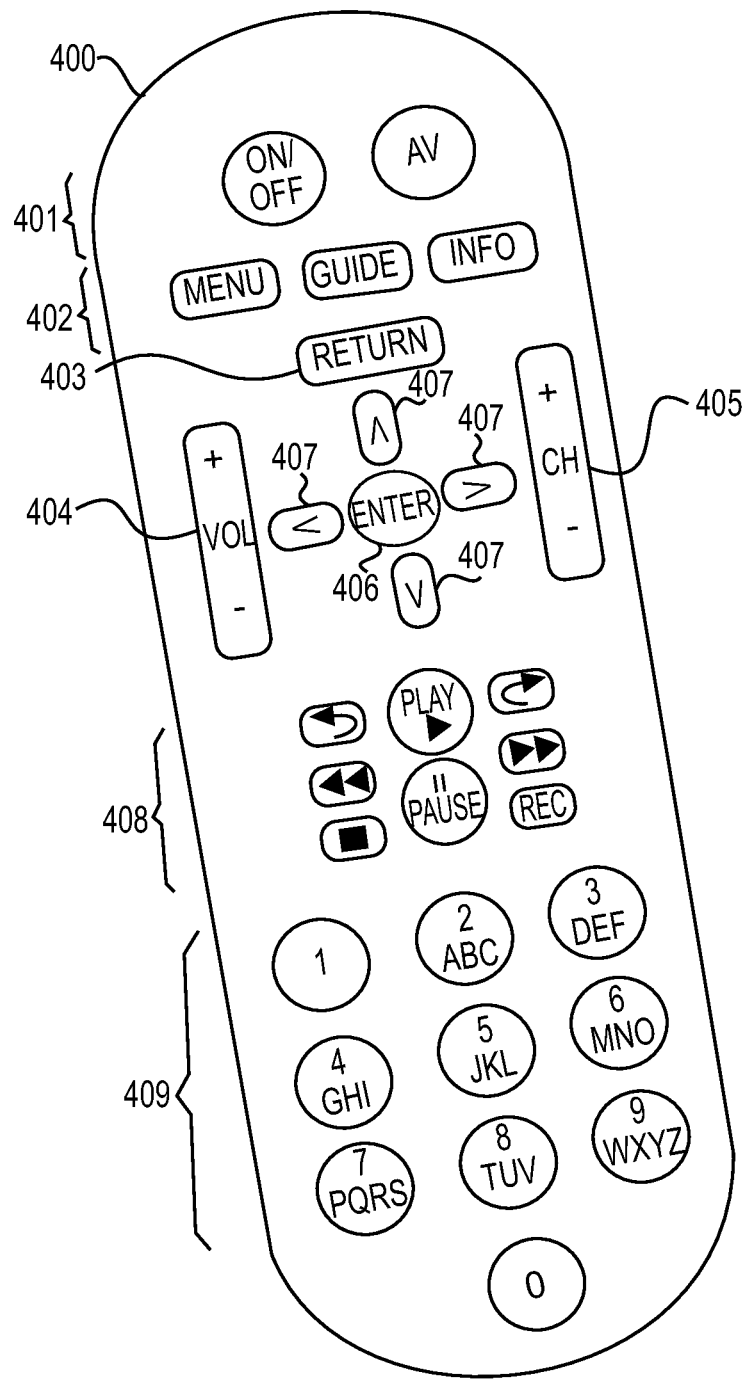
FIG. 4 is a simplified example of an input device in the form of a remote control.

An example of a TV remote control 400 is shown in FIG. 4. A first section of the remote control 400 can include a set of miscellaneous keys 401, which can include power buttons or audio-visual (AV) buttons. Menu, guide, or information buttons 402 can be used for selecting corresponding views on the TV. Another section of the remote control can include arrow keys 407 for moving up, down, left, or right on a menu, guide, or information view. A return button 403 can allow a user to go back a view, and an enter button 406 allows a user to affirmatively make a selection on a view. Additional keys can include channel up/down button 405 and volume up/down button 404. Another section can include program manipulation keys 408 for playing, pausing, stopping, fast-forwarding, reversing, or recording content. Another section can include digital keys 409 for numeric or alphanumeric selection of content. Other sections and keys can be used in more complex remote control or user endpoint input systems, such as QWERTY keyboards, widget buttons, etc.

Figure 5:
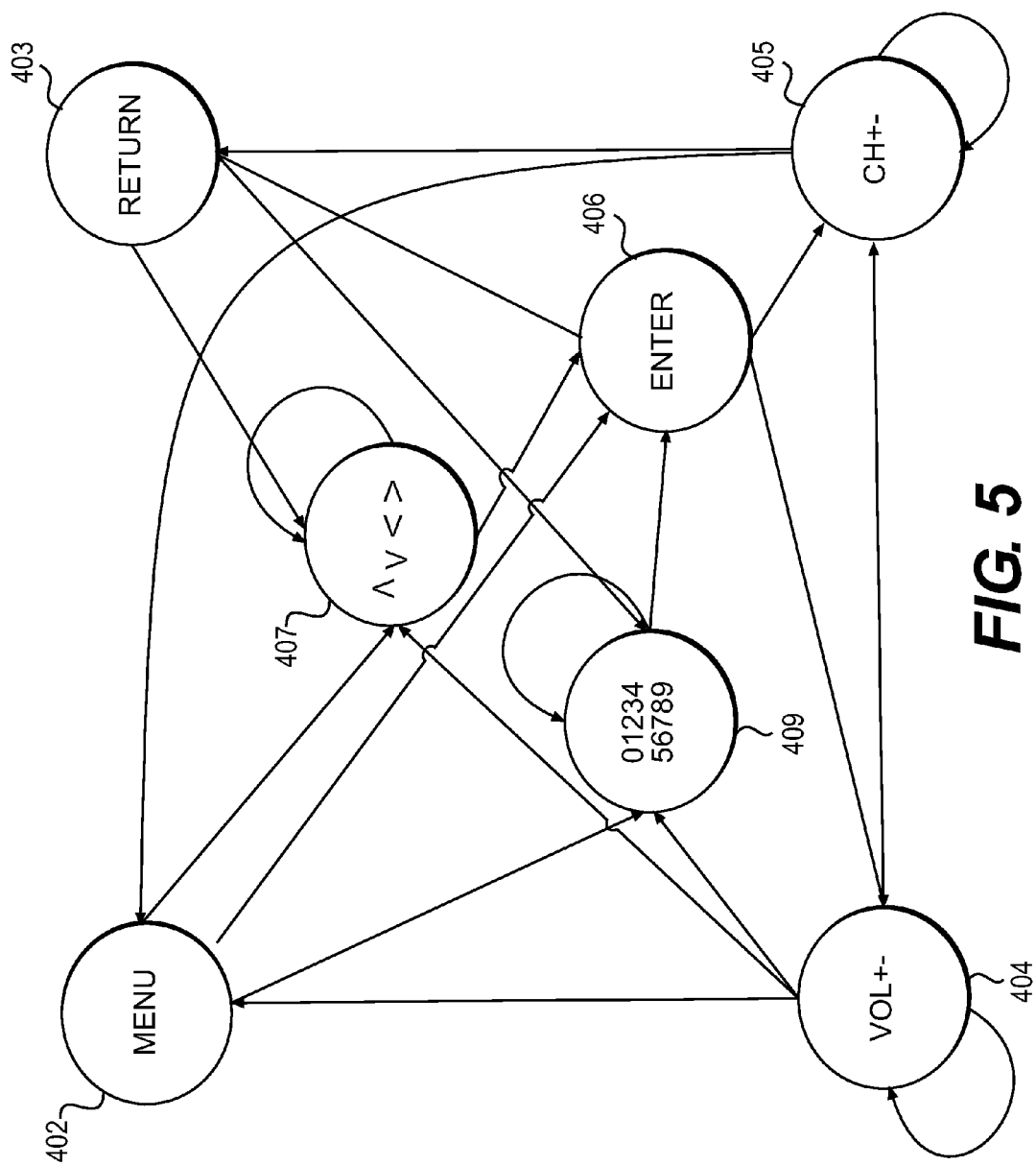
FIG. 5 is an example of a key transferring pattern.

As shown in FIG. 5, an example diagram of a key transferring pattern is demonstrated, where for each arrowed curve, the destination node refers to the key just pressed and the originating node refers to the key pressed earlier than that. The probabilities of these node transitions form a key transferring pattern, which can be very useful for the user behavior analysis. There are many ways to implement this concept, as shown in FIG. 5, all digital keys 409 are considered as the same key, thus transition from digital "3" to "5" would be represented by a self-loop, but this does not have to be this way if another implementation prefers to separate all 10 digits into 10 nodes. Likewise, all arrow keys 407 can be singular or plural nodes.

Each of the sections or individual keys 401-409 of remote control 400 is assigned as $K_n$. Denote by $P_u(K_i)$ the probability of using node (or key) $K_i$, and $P_u(K_iK_j)$ the probability of transition from node $K_i$ to $K_j$, where i and j are the indices of the node, and u is the index of the user. $P_u(K_i)$ can be calculated as the total using frequency of node $K_i$ divided by the total using frequency of all nodes. Similarly $P_u(K_iK_j)$ can be calculated.

The following similarity evaluation (Eq. 1 below) will be used to determine whether there is a new user or whether a new mood of the user is recently introduced.

$$\text{Similarity} = \begin{cases} 1 & \text{if } \cos(P_{u1}(K_i), P_{u2}(K_i)) * \cos\left(\begin{matrix}P_{u1}(K_iK_j), \\ P_{u2}(K_iK_j)\end{matrix}\right) > T \\ 0 & \text{otherwise,} \end{cases} \quad (1)$$

where u1 and u2 refers to two different users in comparison, and T is the threshold between [0, 1] that can be determined by the system.

2.2 User Mood Detection

As the user's preference may change during a different mood or emotion, it is important to find ways to detect the current mood of the user or user group. In past works, people have been detecting and recognizing user mood from the music, video or other media that he/she is using. Many biosignals, such as facial expression, skin temperature, respiration, and so on, have been used to recognize whether a human-being is in a mood such as happiness, sadness, surprise, anger, fear, disgust and so on. Examples of such detection can be found in incorporated by reference works: L. Lu, D. Liu, H. Zhang, "Automatic Mood Detection and Tracking of Music Audio Signals", IEEE Trans. Audio, Speech, and Language Processing, Vol. 14, No. 1, January 2006. pp. 5-18; S. Kim, P. G. Georgiou, S. Lee, and S. Narayanan, "Real-time Emotion Detection System using Speech: Multi-modal Fusion of Different Timescale Features", in *Proc. IEEE MMSP* 2007; S. Zhang, Q. Tian, Q. Huang, W. Gao, and S. Li, "Utilizing Affective Analysis for Efficient Movie Browsing", in *Proc. IEEE ICIP* 2009.

In this work, content is linked into a database of vectors of emotion, thus from the users recent content viewing history, the user mood can be derived. In addition, a remote control key press model is built to map into various emotions, thus from the user interaction behavior, a secondary opinion of user mood is detected. By using an equation similar to Eq. (1), the similarity between emotion vectors is compared and thus the current user mood is mapped into a category within the mood list.

3.0 User Preference Analyses

The user preference analysis targets to characterize a user according to his/her long-term TV viewing history, where the content-based classification method can be applied. Typically a TV content can be labeled as a vector $<X_i>$ where $X_i$ belongs to $\{0, 1\}$ when representing a movie/program category type or actor/award information, for example, a genre category such as drama, horror, or action movie, and $X_i$ can also represents a TV channel which belongs to a larger integer set.

A simplified version of the mixture Gaussian model is adopted, which was proposed by incorporated by reference C. Stauffer and W. E. L. Grimson, "Learning Patterns of Activity Using Real-Time Tracking", *IEEE Transactions on Pattern Analysis and Machine Intelligence*, August 2000 to solve real-time moving object tracking, into the user preference study.

In this work, the user preference is modeled and represented by a mixture of K Gaussian distributions (K=1 for the case $X_i$ is a binary value), where each Gaussian distribution is weighted according to the frequency with which it belongs to a specific category. So the probability that the user prefers $X_t$ at time t is estimated as:

$$P(X_t) = \sum_{i=1}^{K} w_{i,t} \frac{1}{\sqrt{2\pi}\,\sigma_i} e^{-\frac{1}{2}(X_t - \mu_{i,t})^T \sum^{-1}(X_t - \mu_{i,t})}, \quad (2)$$

where $w_{i,t}$ is the normalized weight, and $\mu_i$ and $\sigma_i$ are the mean and the standard deviation of the ith distribution.

The most influential distributions in the mixture form are determined and used to determine if the current user has a specific preference or not. Heuristically, the Gaussian distributions with the most supporting evidence and the least variance are most interesting. Thus, the K distributions are sorted based on the value of $w/\sigma$ and an ordered list is maintained, consequently to keep the most likely distributions on top and leave less probable state-transient distributions to the bottom.

The most likely distribution models for a content category are obtained by $$B = \arg\min_b (\Sigma_{j=1}^{b} w_j > T), \quad (3)$$

where the threshold T is the fraction of the total weight given to a specific category. The current user in evaluation is checked against the existing K Gaussian distributions to detect if the distance between the mean of a distribution is within 2.5 times of the standard deviation of this distribution. If none of the K distributions succeed in the evaluation, the least probable distribution which has the smallest value of $w/\rho$ is replaced by a new Gaussian distribution with the current value as its mean, and a pre-assigned high variance, and low prior weight. Otherwise if the matched distribution is one of the B distributions, the user preference is marked.

To keep the model adaptive, the model parameters are continuously updated using the next content selection from the same user. For the matched Gaussian distribution, all the parameters at time t are updated with this new value $X_t$. In addition, the prior weight is updated by $$w_t = (1\alpha) + w_{t-1}\alpha, \quad (4)$$

and the mean and variance are updated by $$\rho_t = (1\rho) + \mu_{t-1}\rho(-X_t, \quad (5)$$

and $$\sigma_t^2 = (1\rho)\sigma + {}_{t-1}^{2}\rho(-X_t\mu_t)^2, \quad (6)$$

where $\alpha$ is the learning rate controlling adaptation speed, $1/\alpha$ defines the time constant which determines change, and $\rho$ is the probability associated with the current user, scaled by the learning rate $\alpha$. So, $\rho$ can be represented by $$\rho = \alpha \frac{1}{\sqrt{2\pi}\,\sigma_t} e^{-\frac{(X_t - \mu_t)^2}{\sigma_t^2}}. \quad (7)$$

For unmatched distributions, the mean $\mu_t$ and variance $\sigma_t$ remain unchanged, while the prior weight is updated by $$w_t = (1\alpha-)w_{t-1}. \quad (8)$$

An advantage of this updating method is that the original preference distribution remains in the mixture until it becomes the least probable distribution and a new preference is observed. So if a static preference happens to change, the previous preference distribution will be rapidly reincorporated into the model.

4.0 Content Layout Personalization

The content layout personalization efforts consist of content recommendation as well as content layout. The recommendation engine selects a pool of content based on the current user mood, the user's preferences and others' recommendations.

In this work, the layout engine determines the layout of User Interface (UI) and/or content display components according to the user preferences as well as the recommendation content pool. The aim is to minimize the frequency of user interaction.

4.1 Recommendation Engine

In general, recommendation systems have quite similar theoretical foundations, as shown in incorporated by reference works to S. Perugini, M. A. Goncalves, E. A. Fox, "Recommender Systems Research: A Connection-Centric Survey", *Journal of Intelligent Information Systems*, 23:2, 107-143, 2004; G. Adomavicius, and A. Tuzhilin, "Toward the Next Generation of Recommender Systems: A Survey of the State-of-the-Art and Possible Extensions", *IEEE Trans. Knowledge and Data Engineering*, Vol. 17, No. 6, June 2005, pp. 734-749; and T. L. Wickramarathne, K. Premaratne, M. Kubat, and D. T. Jayaweera, "CoFiDS: A Belief-Theoretic Approach for Automated Collaborative Filtering", *IEEE Trans. Knowledge and Data Engineering*, Vol. 23, No. 2, February 2011, pp. 175-189. These similar foundations occur no matter if it is for book, music or video content.

In this work, the recommendation engine relies on the following databases:

D: a content database storing information for all titles/programs available;

R: a database storing information for titles/programs that were recently selected by users in the same/similar interest groups compared to the current user; and U: a database storing content that the current user viewed in a recent time period.

Let us denote by $<Y_i>$ the user preference vector, which corresponds to $<X_i>$, the content characteristic vector. The similarity between these 2 vectors can be calculated by:

$$Sim(X, Y) = \cos(X_i, Y_i) = \frac{X_i \cdot Y_i}{\|X_i\|\|Y_i\|}. \quad (9)$$

The calculation of Sim(X,Y) allows the contents of D to be sorted into a list of content that is most-to-least similar to the user preference vector $<Y_i>$. The list can be adjusted using the results in R and U, as below.

As an example, the following criteria are used during the content selection, though other percentages can be used to adjust the listing:
- 80% of the selections are top-ranked items (obtained from Eq. 9) in D that are not in U; and
- 20% of the selections are top-ranked items in R that are not in U.

After all the selections are ready, a renormalization process is used to get the normalized problem $P_r$ of kth content:

$$P_r(k) = \frac{Sim(X_k, Y_k)}{\sum_{i=1}^{N} Sim(X_i, Y_i)}, \quad (10)$$

where N is the total number of selections in the pool.

4.2 Layout Engine

The layout engine handles the optimization of the following items:
- The choice of the best layout pattern for the current user;
- In the layout, how the content icons and UI components should be arranged; and
- In the layout, how the navigation system should be design to minimize the user's interaction.

Although it is ideal to find an overall optimization solution for the system, in this work the first item is separated from the rest. Subjective tests are made with many different users to find out for each user group with a similar user behavior, what would be the best layout pattern. Then, this pattern list is used to match between the current user and the user groups that have been investigated, based on a similarity check formula to recommend a final pattern. The pattern can be evolved slowly during over the lifetime of usage as more user behavior statistics are collected.

Once the layout pattern is determined, the next question to address is where the navigation starts with and what content to populate to the user. As an example, assume the layout pattern is selected to be a grid-based layout (for example, m*n grid and m=4, n=3 as shown in FIG. 4), which is the most popular layout for IPTV at this moment. Then, find out where the starting point of the navigation would be (it is the node 1 as shown in FIG. 6) and then which m*n content will be selected and then where to put the content (see nodes 2 and 3 as shown in FIG. 6).

Figure 6:
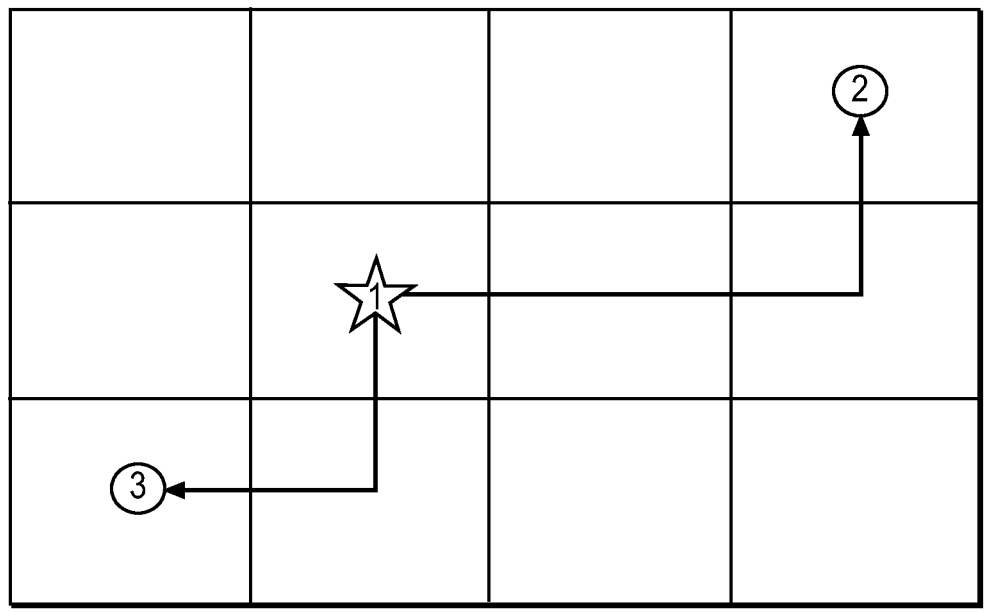
FIG. 6 is an example of an m*n display of content with a possible navigation path from a starting point 1 to icons 2 and 3.

FIG. 6 shows an example of a possible navigation path from the starting point to an icon that the user is trying to select. As shown in FIG. 6, the navigation path from the starting point to a possible icon position is shown. For example, from starting point 1 to position 2, typically 2 right moves and 1 up move need to be made. For this case, the number of clicks (or the length from position 1 to position 2) is L=3, and the probability of such 3 consecutive clicks P1 can be calculated from the key transition probability shown in FIG. 5. In addition, the probability of selecting a certain content title (or icon) P2 has been calculated in section 4.1.

As the goal is to minimize the user interaction, place the most possible selected icon in the position nearest to the navigation starting point. And, use a cost function for putting a certain title in a position such as position 2 via L*P1*P2. Use the cost function definition to minimize the total cost of putting all titles in the grid using the cost function definition.

4.2.1 Optimization Problem Formulation

Assuming m*n selected content obtained from the recommendation engine, denote by Pr(i) the normalized probability of the ith content being selected by the user. The layout engine is required to fit all m*n content icons into a m*n grid. These grids are labeled by 1, 2, ..., and m*n, where Loc(i) represents the position of the ith content. Denote by s the position of the navigation starting point (s=1, 2, ..., or m*n). Pt(j, k) is the key transferring probability from position j to k, which can be easily calculated by the multiplication of the probability of all clicks involved, and L(j,k) is the minimum clicks required to navigate from position j to k. The expected average clicks E[C] can be calculated as:

$$E[C] = \sum_{i=1}^{m*n} L(s, Loc(i)) * Pr(i) * Pt(s, Loc(i)) \quad (11)$$

Thus the problem can be formalized as: Find s, and Loc(i) for all m*n contents, to minimize E[C].

It is important to realize the interplay of elements to minimize E[C], which is in the format of the sum of the multiplication of two independent terms, L(s,j)*Pt(s,j) and Pr(i), where the first term relates to the 2 positions in the grid, and the second term relates to the content titles. Thus for any selection option of s, the list of L(s,j)*Pt(s,j) is ranked in ascending order and Pr(i) is ranked in descending order. Then, making Loc(i)=j, the sum of L(s,j)*Pt(s,j)*Pr(i) is guaranteed to be the minimized value. From this point of view, the optimization problem can be resolved after iteration over all positions for s, and then the position with minimum E[C] can be used for the solution.

In order to speed up the process, a sub-optimal solution is to split the original problem into two:

Find s that minimizes $$\sum_{j=1}^{m*n} L(s, j) * Pt(s, j);$$

and

After the s is determined, then find Loc(i) for all m*n contents, to minimize E[C].

Problem (1) can be resolved as quick as look-up in a pre-assigned table, as it is basically searching the minimum value from a list of limited size, and the solution for problem (2) has been demonstrated as in the text above.

5.0 Conclusions

In this work, a cloud-based TV program recommendation system is proposed, which connects the endpoint display to the remote control and to the intelligent computing in the cloud side. The layout designs as well as the content pushing model are all optimized toward a better user experience based on the remote control usage model.

Many interesting applications can be developed on top of this proposal, for example, every user can have a personalized TV station in the cloud, so that they can get unique TV watching experiences via this personalized TV station, which is optimized to the user's specific taste and behavior model on the remote control.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. The specification and drawings are accordingly to be regarded in an illustrative rather than restrictive sense.

For example, the m*n grid can encompass a variety of shapes, the grid can span multiple viewing screens, the user can scroll to grids on different screens, the system or user can select various styles of grids or can stylize the grids or icons, etc.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

I claim:

1. A system for minimizing interactions with at least an input mechanism, comprising:
at least a management server communicatively coupled to at least a user endpoint device, the user endpoint device comprising at least a display configured to display content, a receiver configured to receive content, an input mechanism configured to change the content displayed on the display, and a transmitter mechanism configured to communicate data related to interactions with the input mechanism and the displayed content,
the management server further communicatively coupled to at least one processor, at least one storage device, and at least one computer-readable storage medium storing software configured to perform data processing,
the at least one storage device configured to store data based on content displayed on the display, interactions with the input mechanism, and content available for viewing,
the at least one processor configured to use the software to process the data such that a layout configuration of content data is prepared for display and the layout configuration is derived from at least the interactions with the input mechanism and the layout configuration is designed to minimize additional user interactions with the input mechanism to select the prepared content data, and
a preference software stored in a computer readable storage medium that is communicatively coupled to the processor, wherein the processor prepares weighted Gaussian distributions representing user preferences based on content selection and input mechanism interactions, and wherein the system is configured to accumulate and store a number of Gaussian distributions over a period of time and the processor is configured to iteratively compare the Gaussian distributions to detect changes in the user's mood.

2. The system of claim 1, wherein the management server is further configured to store content for display or to communicatively couple to another server or database, the another server or database configured to store content for display, and wherein the management server is further configured to provide content to user endpoint devices.

3. The system of claim 1, wherein the processor is configured to use the preference software to analyze one or more of content attribute data, a user mood vector, or a content vector to sort content into a recommended pool of content, and the recommended pool of content is used to derive the layout configuration of content data for display.

4. The system of claim 1, wherein the input mechanism is an analog remote control, a keyboard, a mouse, a synaptic pad, or a touch pad comprising physical or rendered buttons, and wherein the input mechanism is configured to translate a user's interaction into a digital, wireless, or optical signal, and wherein the management server further comprises a probability table representing the probability that the user will interact with one of the buttons after another one of the buttons, and the probability table is used to derive the layout configuration of content data for display.

5. The system of claim 4, wherein the user endpoint device further comprises at least one of firmware, hardware, or software configured to collect first endpoint data representing one or more of a sequence of button selection, a frequency of button selection, or a frequency of input mechanism interaction, and the user endpoint device is further configured to collect second endpoint data representing one or more of the content selected for display or a duration the content is displayed, and the user endpoint device transmits the first and second endpoint data to the management server, and the management server is configured to receive and process the first and second endpoint data to derive the layout configuration of content data.

6. The system of claim 5, wherein the user endpoint device is further configured to collect user input endpoint data related to content or layout preferences comprising one or more data of the type actor, actress, genre, title, viewing time, author, category, grid size, row size, column size, display screen width, or preferred buttons, wherein the user endpoint device transmits the endpoint data to the management server, the management server is configured to receive and process the endpoint data, and the user input endpoint data is used to derive the layout configuration of content data.

7. The system of claim 4, wherein the layout configuration is further based on a button usage model based on the following equation:

$$\text{Similarity} = \begin{cases} 1 & \text{if } \cos(P_{u1}(K_i), P_{u2}(K_i)) * \cos(P_{u1}(K_iK_j), P_{u2}(K_iK_j)) > T \\ 0 & \text{otherwise} \end{cases}$$

where $K_i$ represents a node, $P_u(K_i)$ is the probability of using the node $K_i$, $P_u(K_iK_j)$ is the probability of transition from node $K_i$ to node $K_j$, u1 and u2 refer to two different users, and T is a threshold between [0, 1].

8. The system of claim 1, further comprising a content recommendation engine, wherein the management server is further configured to communicatively couple to the content recommendation engine, and wherein the content recommendation engine is configured to recommend the content data for display based on inputs into the content recommendation engine related to one or more of user mood vectors, user preferences, or other user's recommendations,
wherein the content recommendation engine receives data from a content database, a similar interest group database, and a recently viewed user database and wherein the content recommendation engine combines content from each of the content database, the similar interest group database, and the recently viewed user database in order to recommend content for display, and
wherein the content recommendation engine combines content from each of the content database, the similar interest group database, and the recently viewed user database to evaluate similarity between a user preference and a content characteristic.

9. The system of claim 8, wherein the similarity is evaluated by:

$$\mathrm{Sim}(X, Y) = \cos(X_i, Y_i) = \frac{X_i \cdot Y_i}{\|X_i\| \|Y_i\|}$$

where <$Y_i$> denotes a user preference vector, and <$X_i$> stands for a content characteristic vector.

10. A system for minimizing interactions with at least an input mechanism, comprising:
at least a management server communicatively coupled to at least a user endpoint device, the user endpoint device comprising at least a display configured to display content, a receiver configured to receive content, an input mechanism configured to change the content displayed on the display, and a transmitter mechanism configured to communicate data related to interactions with the input mechanism and the displayed content,
the management server further communicatively coupled to at least one processor, at least one storage device, and at least one computer-readable storage medium storing software configured to perform data processing,
the at least one storage device configured to store data based on content displayed on the display, interactions with the input mechanism, and content available for viewing, and
the at least one processor configured to use the software to process the data such that a layout configuration of content data is prepared for display and the layout configuration is derived from at least the interactions with buttons on the input mechanism and the layout configuration is designed to minimize additional user interactions with the buttons on the input mechanism to select the prepared content data,
wherein the input mechanism is an analog remote control, a keyboard, a mouse, a synaptic pad, or a touch pad comprising physical or rendered buttons, and wherein the input mechanism is configured to translate a user's interaction into a digital, wireless, or optical signal,
wherein the user endpoint device further comprises at least one of firmware, hardware, or software configured to collect first endpoint data representing one or more of a sequence of button selection, a frequency of button selection, or a frequency of input mechanism interaction, and the user endpoint device is further configured to collect second endpoint data representing one or more of the content selected for display or a duration the content is displayed, and the user endpoint device transmits the first and second endpoint data to the management server, and the management server is configured to receive and process the first and second endpoint data to derive the layout configuration of content data,
wherein the system further comprises user behavior analyzer software stored in the computer readable storage medium that is communicatively coupled to the management server,
wherein the processor uses the user behavior analyzer software and the received first and second endpoint data to monitor, detect, and evaluate a user mood or user behavior,
wherein the processor prepares a user mood vector based on the second endpoint data and a button usage model based on the first endpoint data, and the processor uses the user mood vector and the button usage model to derive the layout configuration of content data, and
wherein the button usage model is based on the probability of using a first of the buttons and the probability of transition from the first of the buttons to another of the buttons.

11. The system of claim 10, wherein the button usage model is based on the following equation:

$$\mathrm{Similarity} = \begin{cases} 1 & \text{if } \cos(P_{u1}(K_i), P_{u2}(K_i)) * \cos(P_{u1}(K_iK_j), P_{u2}(K_iK_j)) > T \\ 0 & \text{otherwise} \end{cases}$$

where $K_i$ represents a node, $P_u(K_i)$ is the probability of using the node $K_i$, $P_u(K_iK_j)$ is the probability of transition from node $K_i$ to node $K_j$, u1 and u2 refer to two different users, and T is a threshold between [0, 1].

12. The system of claim 10, wherein the management server further comprises a probability table representing the probability that the user will interact with one of the buttons after another one of the buttons, and the probability table is also used to derive the layout configuration of content data for display.

13. A system for minimizing interactions with at least an input mechanism, comprising:
at least a management server communicatively coupled to at least a user endpoint device, the user endpoint device comprising at least a display configured to display content, a receiver configured to receive content, an input mechanism configured to change the content displayed on the display, and a transmitter mechanism configured to communicate data related to interactions with the input mechanism and the displayed content,
the management server further communicatively coupled to at least one processor, at least one storage device, and at least one computer-readable storage medium storing software configured to perform data processing,
the at least one storage device configured to store data based on content displayed on the display, interactions with the input mechanism, and content available for viewing, and
the at least one processor configured to use the software to process the data such that a layout configuration of content data is prepared for display and the layout configuration is derived from at least the interactions with the input mechanism and the layout configuration is designed to minimize additional user interactions with the input mechanism to select the prepared content data,
wherein the system further comprises a layout engine, wherein the management server is further configured to communicatively couple to the layout engine, and the layout engine is configured to recommend the layout configuration of the content data for display based additionally on one or more of the probability of a content selection, a content placement cost function, a key transferring probability, and an expected average button-click calculation,
and wherein the layout configuration of the content data is optimized for least button clicks to select a most probable content by minimizing an expected average button clicks to select the most probable content.

14. The system of claim 13, wherein the expected average button clicks is calculated using:

$$E[C] = \sum_{i=1}^{m*n} L(s, Loc(i)) * Pr(i) * Pt(s, Loc(i))$$

wherein m and n indicate dimensions of a layout for selected content, Pr(i) is a normalized probability of the $i^{th}$ content being selected by a user, Loc(i) represents a position of the $i^{th}$ content in the layout, s is a position of a navigation starting point in the layout, Pt(j, k) is a key transferring probability from position j to position k in the layout, and L(j,k) is a minimum number of button clicks required to navigate from position j to position k in the layout.

15. A method for minimizing interactions with at least an input mechanism, comprising:
   receiving endpoint data at a management server that is communicatively coupled to a user endpoint device, the user endpoint device comprising at least a display configured to display content, a receiver configured to receive content, an input mechanism configured to change the content displayed on the display, and a transmitter mechanism configured to communicate data related to interactions with the input mechanism and the displayed content,
   storing endpoint data and software in a storage device communicatively coupled to the management server, the endpoint data comprising data related to at least content displayed on the display, interactions with the input mechanism, and content available for viewing,
   processing the endpoint data in a processor communicatively coupled to the management server, the processor executing software such that a layout configuration of content data is prepared for display, and the layout configuration is derived from at least the interactions with the input mechanism, and the layout configuration is designed to minimize additional user interactions with the input mechanism to select the prepared content data, and
   storing preference software in a computer readable storage medium that is communicatively coupled to the processor, and preparing in the processor, with the preference software, weighted Gaussian distributions representing user preferences based on content selection and input mechanism interactions, accumulating and storing a number of Gaussian distributions over a period of time, and iteratively comparing the Gaussian distributions to detect changes in a user's mood.

16. The method of claim 15, further comprising: optimizing the layout configuration of the content data by calculating a probability for each content data that respective ones will be selected and then arranging the content data in the layout configuration to minimize an expected average button clicks to select the most probable content data.

17. The method of claim 16, further comprising assembling a probability table representing the probability that the user will interact with one of the buttons after another one of the buttons, and deriving the layout configuration of content data for display based also on the probability table.

18. The method of claim 15, further comprising calculating a button usage model based on the probability of using a first of the buttons and the probability of transitioning from the first of the buttons to another of the buttons, and deriving the layout configuration of content data for display based also on the button usage model.

19. The method of claim 15, further comprising executing user preference analyzer software stored in a computer-readable storage medium that is communicatively coupled to the management server, wherein the user preference analyzer software analyzes one or more of content attribute data, a user mood vector, or a content vector to sort content into a recommended pool of content, and deriving the layout configuration of content data for display based also on the recommended pool of content.

20. The method of claim 15, further comprising calculating a probability table representing the probability that the user will interact with one of the buttons after another one of the buttons, and deriving the layout configuration of content data for display based also on the probability table.

\* \* \* \* \*